US008522959B2

(12) United States Patent  
Ceci

(10) Patent No.: US 8,522,959 B2  
(45) Date of Patent: Sep. 3, 2013

(54) CAP TRANSFER UNIT HAVING A MOVABLE CAP PUSHER

(75) Inventor: Ivano Ceci, Le Havre (FR)

(73) Assignee: Sidel Participations, Octeville sur Mer (FR)

( * ) Notice: Subject to any disclaimer, the term of this patent is extended or adjusted under 35 U.S.C. 154(b) by 239 days.

(21) Appl. No.: 12/812,392

(22) PCT Filed: Jan. 11, 2008

(86) PCT No.: PCT/IB2008/001094  
§ 371 (c)(1),  
(2), (4) Date: Sep. 29, 2010

(87) PCT Pub. No.: WO2009/087434  
PCT Pub. Date: Jul. 16, 2009

(65) Prior Publication Data  
US 2011/0005900 A1    Jan. 13, 2011

(51) Int. Cl.  
*B65G 37/00* (2006.01)  
*B65G 47/82* (2006.01)

(52) U.S. Cl.  
USPC .......... 198/747; 198/717; 414/798.6; 53/471; 53/485

(58) Field of Classification Search  
USPC .............. 198/717, 747; 414/798.6; 53/309, 53/310, 331.5, 471, 485  
See application file for complete search history.

(56) References Cited

U.S. PATENT DOCUMENTS

| | | | |
|---|---|---|---|
| 2,023,401 A | 12/1935 | Block | |
| 2,264,738 A | 12/1941 | Blann | |
| 2,539,652 A | 1/1951 | Amberg et al. | |
| 3,212,231 A * | 10/1965 | Pechmann | 53/307 |
| 4,676,359 A * | 6/1987 | Swapp et al. | 198/370.07 |
| 4,756,137 A * | 7/1988 | Lanigan | 53/202 |
| 5,301,488 A * | 4/1994 | Ruhl et al. | 53/55 |
| 5,473,857 A * | 12/1995 | Keeler | 53/410 |
| 5,493,849 A * | 2/1996 | Itoh | 53/489 |
| 5,617,781 A | 4/1997 | Nakatani et al. | |
| 5,630,697 A * | 5/1997 | Black, Jr. | 414/798.6 |
| 5,857,309 A | 1/1999 | Cicha et al. | |
| 6,578,614 B1 * | 6/2003 | Loewenthal | 156/358 |
| 6,804,929 B2 * | 10/2004 | Kemnitz | 53/75 |
| 7,059,104 B2 * | 6/2006 | Taylor | 53/471 |
| 7,735,297 B2 * | 6/2010 | Monti | 53/329 |
| 7,837,093 B1 * | 11/2010 | Leu et al. | 235/375 |
| 2001/0052483 A1 | 12/2001 | Orange et al. | |
| 2007/0006550 A1 | 1/2007 | Kemper et al. | |

FOREIGN PATENT DOCUMENTS

| | | |
|---|---|---|
| EP | 0692196 A1 | 1/1996 |
| FR | 2810297 A1 | 12/2001 |
| JP | 4-242525 A | 8/1992 |
| JP | 2001-341707 A | 12/2001 |
| WO | 98/43879 A1 | 10/1998 |

* cited by examiner

*Primary Examiner* — Douglas Hess  
(74) *Attorney, Agent, or Firm* — Sughrue, Mion, PLLC

(57) ABSTRACT

A cap transfer unit (1) comprising a cap transfer line (8) defining a transfer path (5) from a cap loading area (4) to a cap discharge area (6), and a cap pusher (16) slidingly mounted along the cap transfer line (8), the cap pusher (16) having a rest position in which the cap pusher (16) is spaced from the transfer path (5), and an active position in which the cap pusher (16) overlaps at least partially the transfer path (5) for coming into abutment with caps (2) located therein.

17 Claims, 4 Drawing Sheets

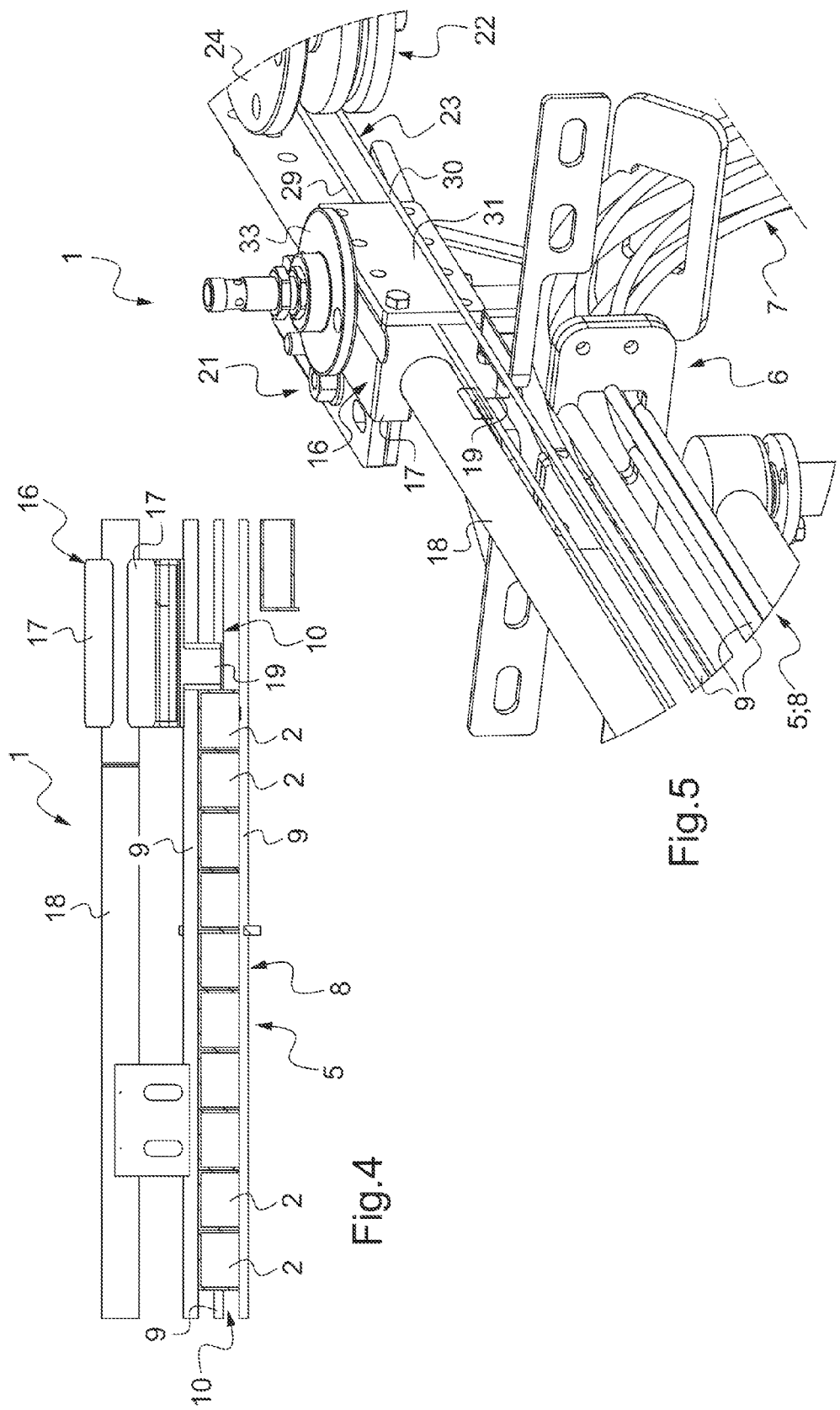

CAP TRANSFER UNIT HAVING A MOVABLE CAP PUSHER

CROSS REFERENCE TO RELATED APPLICATIONS

This application is a National Stage of International Application No. PCT/IB2008/001094 filed Jan. 11, 2008, contents of which is incorporated herein by reference in its entirety.

FIELD OF THE INVENTION

The invention relates to the container industry, and more specifically to the capping of containers.

BACKGROUND OF THE INVENTION

Once filled, containers are immediately capped, at a capping unit, with caps supplied by a cap feeding unit.

In an ordinary cap feeding unit, caps are supplied from a hopper into a cap feeding line where caps are moved in at least one row towards the capping unit. As caps are initially stored in a non-sterile environment (such as a hopper), they are generally sterilized before they reach the capping unit.

More precisely, caps are generally moved by a cap transfer unit, along a transfer path, through a sterile chamber where sterilization is realized, e.g. by spraying hot hydrogen peroxide, in order to subsequently close the containers which have been filled in aseptic conditions. One may refer to US patent application No. US 2007/0006550 (SIG TECHNOLOGY) for further details regarding cap sterilization.

Several technologies are ordinarily used to move the caps along their path, depending upon the configuration of the feeding lines and the operations the caps are undergoing. For example, cap supply from the hopper may be achieved by the sole gravity, to an inclined (or vertical) feeding line. In other portions of their path, the caps may be moved by a stream of pulsed air, provided by air nozzles located in the vicinity of the path. It is critical to ensure smooth and quick movement of the caps, since, in the end, the cap supply rate must be equal to the predetermined capping rate, which in turn is equal to the container filling rate. Nowadays such rates can reach up to several tens of thousands units per hour.

Cap transfer through the sterilization chamber is a peculiar operation in cap handling, for submission of the caps to the sterilization agent must take a predetermined time, which must be long enough to achieve sterilization, and yet short enough to avoid cap damage since hot hydrogen peroxide may cause surface attack.

This is why, in the sterilization chamber the moving speed of the caps is generally controlled, e.g. by means of a transfer wheel located in a loading area of the cap transfer line, the rotational speed of which is set to a predetermined value. It is also preferable to arrange horizontally the cap transfer line, in order to avoid uncontrolled displacement of the caps during the sterilization process. Furthermore, since the environment in the sterilization chamber must be kept sterile, it is not allowed to use air nozzles to force the caps along the transfer line.

Such a design may lead to a major difficulty. When caps are missing upstream the transfer wheel, e.g. because of an upstream cap jam or emptiness of the hopper, the caps standing along the transfer path in the sterilization chamber are stopped, thereby leading to cap damage.

SUMMARY OF THE INVENTION

It is an object of the invention to provide a cap transfer unit with enhanced reliability, reducing the risk of cap damage.

Accordingly, the invention provides a cap transfer unit comprising a cap transfer line defining a transfer path from a cap loading area to a cap discharge area, and a cap pusher slidingly mounted along the cap transfer line, the cap pusher having a rest position in which the cap pusher is spaced from the transfer path, and an active position in which the cap pusher overlaps at least partially the transfer path for coming into abutment with caps located therein.

The above and other objects and advantages of the invention will become apparent from the detailed description of preferred embodiments, considered in conjunction with the accompanying drawings.

BRIEF DESCRIPTION OF THE DRAWINGS

FIG. 4 is a partial cut view of the cap transfer unit of FIG. 3.

FIG. 5 is an enlarged perspective view of the cap transfer unit, centered on a discharge area, in which the cap pusher is in a stop position.

DESCRIPTION OF PREFERRED EMBODIMENTS

Figure 1:
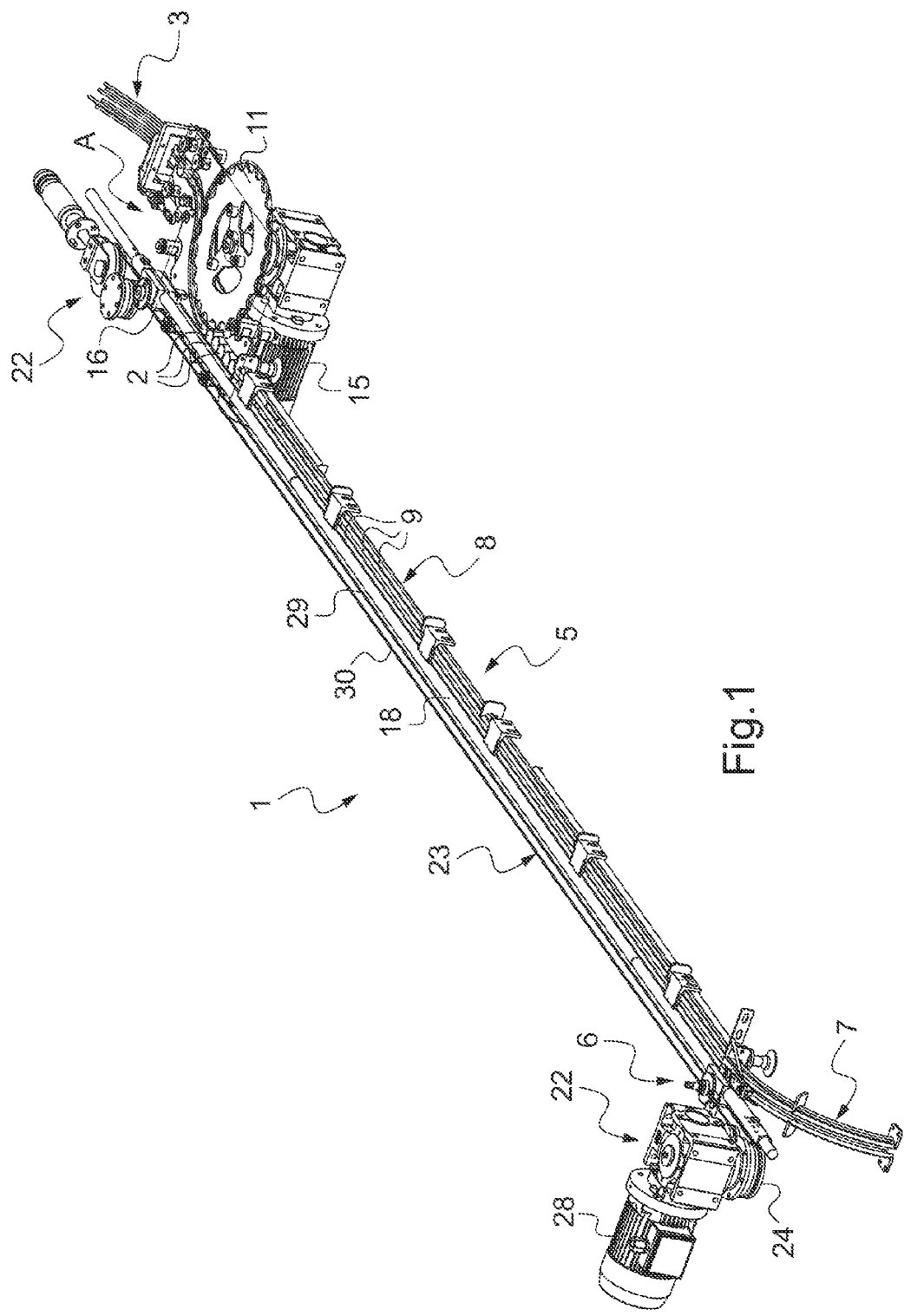
FIG. 1 is a top perspective view showing a cap transfer unit according to the invention.

Turning now to the drawings, there is shown a cap transfer unit 1, as part of a container handling machine in which containers are sterilized, filled and then capped.

Caps 2 are put in bulk in a hopper (not shown), for example of the rotating/vibrating type, standing on top of a machine frame, and fed from the hopper to an upstream cap feeding line 3 receiving a row of caps 2.

The cap feeding line 3 moves the caps 2 from the hopper to a loading area 4 where caps 2 are fed to the cap transfer unit 1. Caps 2 are then transferred by the cap transfer unit 1, with their concavity oriented downwards, from the cap loading area 4, along a cap transfer path 5, to a cap discharge area 6. In the cap discharge area 6, caps 2 are fed to a downstream cap feeding line 7 in which caps are moved to a container capping unit, where caps 2 are put on the mouths of the containers and screwed thereto.

The cap transfer path 5 goes horizontally in straight line across a cap sterilization chamber. More precisely, as illustrated, the container transfer unit 1 comprises a straight guide rail 8 including a group of wires 9 together defining an inner space 10 in which the caps 2 are slidingly received.

Figure 2:
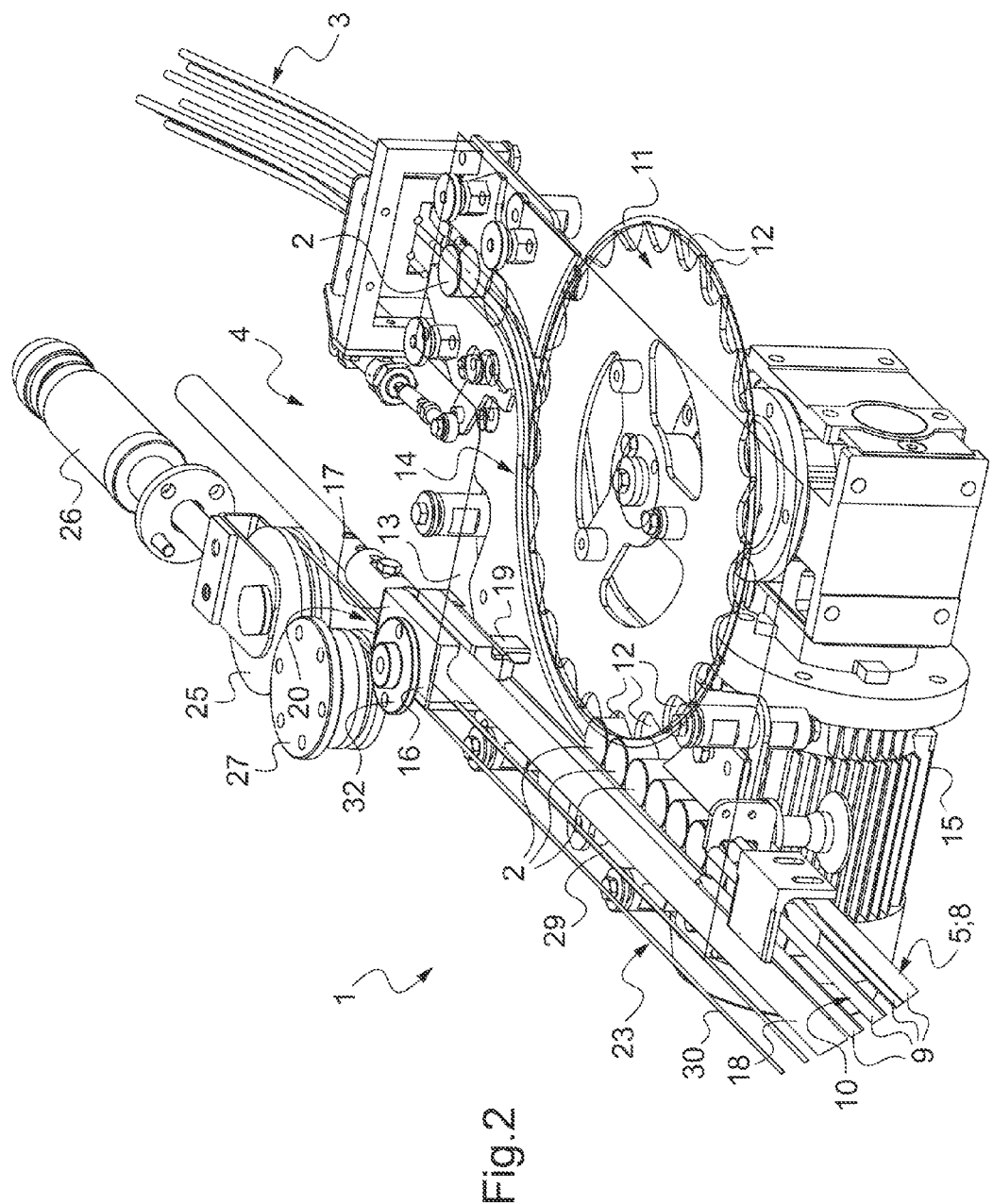
FIG. 2 is an enlarged perspective view, centered on a loading area of the cap transfer unit of FIG. 1, partly cut-out, in which a cap pusher is in a rest position.
Figure 3:
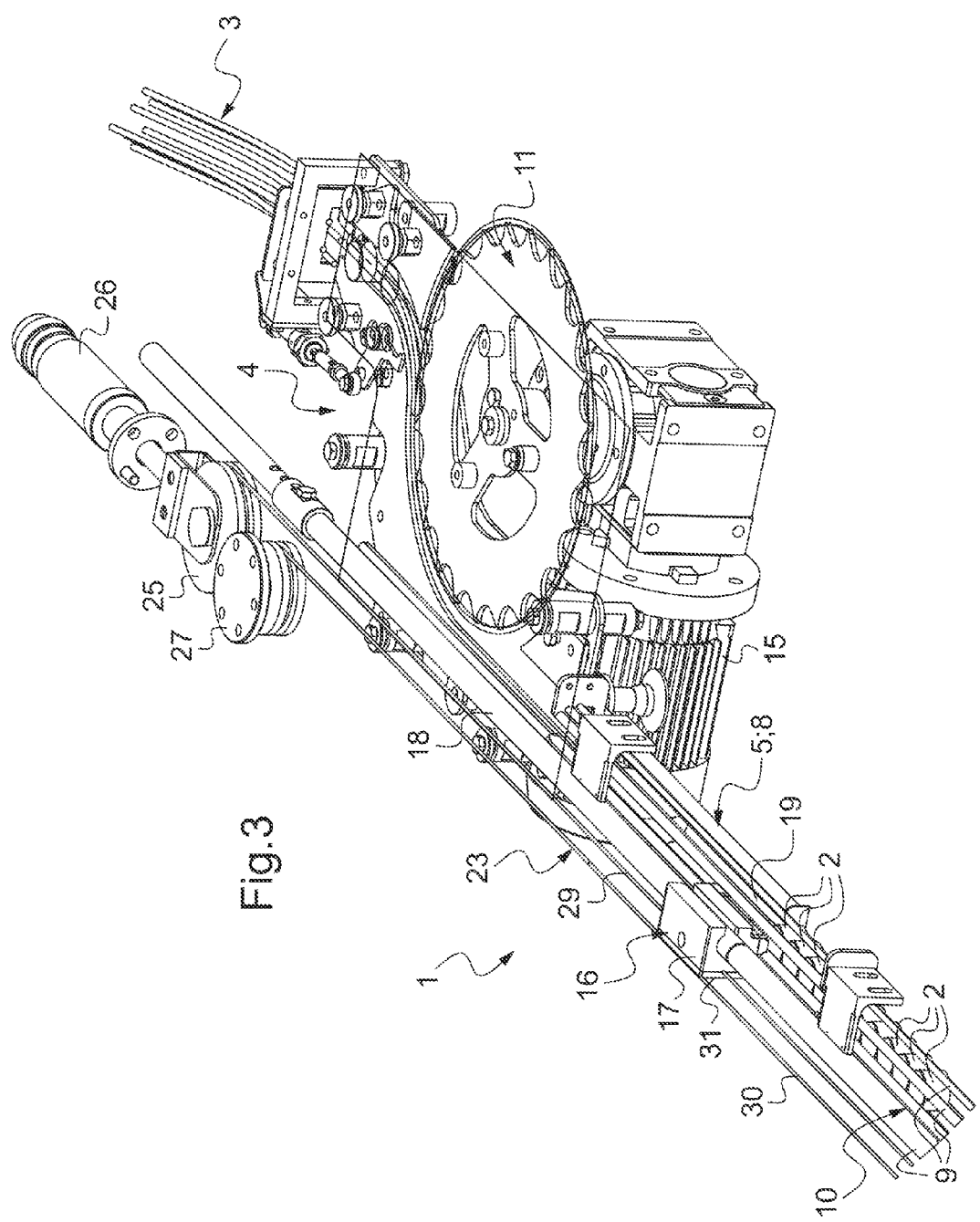
FIG. 3 is view similar to FIG. 2, in which the cap pusher is in an active position.

In the loading area 4, as depicted on FIG. 1 and with more details on FIG. 2 and FIG. 3, the container transfer unit 1 comprises a cap transfer star wheel 11 interposed between the upstream cap feeding line 3 and the guide rail 8. The star wheel 11 is provided, on its periphery, with a plurality of recesses 12 for engaging caps 2. A curved guide 13 is mounted between the upstream feeding line 3 and a proximal end of the guide rail 8, defining an arc-of-circle path 14 along which caps 2 received in the recesses 12 are moved to the guiding rail 8.

As depicted on FIG. 2, the star wheel 11 is driven by a motor 15 fixed on a machine frame. The motor 15 controls the rotational speed of the star wheel 11, and thus, in normal operation, the linear speed of the caps 2 in the guide rail 8, which corresponds to the tangential speed of the star wheel 11.

The cap transfer unit 1 further comprises a cap pusher 16, slidingly mounted along the cap transfer path 5. More precisely, the cap pusher 16 comprises a body 17 slidingly mounted on a cylindrical guiding rod 18 extending parallel to and above the guide rail 8, and a finger 19 protruding downwardly from the body 17 for contacting the caps 2, as will be disclosed in further details hereinafter.

As depicted on FIG. 2-5, the cap pusher 16 has three positions, i.e.:
  a rest position in which the cap pusher 16 is spaced from the transfer path 5, and more precisely in a zone 20 free of caps located upstream beyond the transfer path 5 in the vicinity of the loading area 4 (FIG. 2),
  a stop position in which the cap pusher 16 is spaced from the transfer path 5 in the vicinity of the discharge area 6, and more precisely in a zone 21 free of caps located downstream beyond the transfer path 5 in the vicinity of the discharge area 6, and
  an active position, intermediate between the rest position and the stop position, in which the cap pusher 16 is located along the transfer path 5 between the loading area 4 and the discharge area 6 and wherein the cap pusher 16 at least partially overlaps the transfer path 5.

More precisely, in the active position, the finger 19 protrudes transversally across the inner space 10 of the guide rail 8 for coming into abutment with caps 2 located therein and standing still, to push them along the transfer path 5 to the discharge area 6.

The rest position is the default position of the cap pusher 16 in a normal operation of the cap transfer unit 1, as long as a continuous flow of caps 2 are fed from the upstream feeding line 3 to the guide rail 8 via the star wheel 11.

However, in the event the flow is (at least temporarily) interrupted, e.g. when the hopper is empty and not refilled yet, no more caps 2 are fed to the guide rail 8, whereby the caps 2 present therein are no more moved under rotation of the star wheel 11, and hence stop along the transfer path 5.

It is not recommended to let caps 2 stand still along the transfer path 5, for it may lead to possible cap damage (and thus to cap or even filled container waste) due to the possible surface attack from the sterilizing medium (e.g. hot hydrogen peroxide).

Therefore, as soon as an interruption of the flow of caps 2 is sensed in the loading area 4, the cap pusher 16 is translated from its rest position to its active position (FIG. 3) wherein the finger 19 comes into abutment with the row of caps 2 standing still in the guide rail 8. As the pusher 16 moves along the transfer path 5, it forces the caps 2 to slide in the guiding rail 8 to the discharged area 6, where they are fed to the downstream cap feeding line 7. The cap pusher 16 then reaches its stop position where it is stopped and translated back to its rest position.

During movement of the cap pusher 16, the star wheel 11 is stopped to prevent additional caps 2 from being fed to the guide rail 8 upstream the cap pusher 16 as the same is in its active position, thereby avoiding cap jamming as the cap pusher 16 returns to its rest position.

Interruption of the flow of caps 2 may be sensed by means of a presence sensor located e.g. in the loading area 4, e.g. at the vertical of the curved guide 13, whereby when absence of caps is sensed during a predetermined amount of time (for example corresponding to the ordinary passage of five successive caps), the sensor sends an emergency signal to a control unit which in reaction commands stopover of the star wheel 11 and displacement of the cap pusher 16 to evacuate from the guide rail 8 the residual caps 2 standing therein.

As depicted on the drawings, movement of the cap pusher 16 along the transfer path 5 is ensured by a drive unit 22 comprising a drive cable 23 mounted between a driving pulley 24 located in the vicinity of the discharge area 6, and a driven pulley 25 located in the vicinity of the loading area 4.

As illustrated on FIG. 2, the driven pulley 25 is mounted on a bracket 26 fixed to a machine frame, and a cable tightener pulley 27 is mounted in the vicinity of the driven pulley 25 with transversal travel in order to ensure tightening of the cable 23.

As depicted on FIG. 3, a motor 28 is coupled to the driving pulley 24 for rotating the driving pulley 24 and hence translating the cable 23 (and the cap pusher 16 fixed thereto) along the transfer path 5.

The cable 23 includes a front strand 29 running parallel to the guiding rail 8 in the vicinity thereof, and a rear strand 30 running at a distance therefrom. The cap pusher 16 is attached to the front strand 29 of the cable 23 by means of a lateral plate 31 screwed to the body 17 of the cap pusher 16 to rigidly clamp the strand 29.

In addition, presence sensors (such a capacitive sensors) may be provided for controlling positions of the cap pusher 16, e.g. a first sensor 32 located at the vertical of the rest position (FIG. 2) for sensing presence of the cap pusher 16 in the rest position, and a stop sensor 33 located at the vertical of the stop position (FIG. 5) for sensing presence of the cap pusher 16 in the stop position.

The cap transfer unit 1 according to the invention provides safe and reliable cap emergency displacement in cap handling areas in which ordinary cap displacement means (such as pulsed air) do not apply.

The invention claimed is:

1. A cap transfer unit comprising a guide rail defining a transfer path from a cap loading area to a cap discharge area, a star wheel in the loading area, the star wheel interposed between an upstream cap feeding line and the guide rail for feeding the caps to the transfer path, and a cap pusher slidingly mounted along the guide rail, the cap pusher having a rest position in which the cap pusher is spaced from the transfer path, and an active position in which the cap pusher overlaps at least partially the transfer path for coming into abutment with caps located therein.

2. A cap transfer unit according to claim 1, comprising a guiding rod mounted parallel to the cap transfer line, on which the pusher is slidingly mounted.

3. A cap transfer unit according to claim 1, wherein the pusher comprises a body mounted on the guiding rod, and a finger protruding from the body for contacting the caps.

4. A cap transfer unit according to claim 1, further comprising a drive unit for moving the cap pusher along the transfer path.

5. A cap transfer unit according to claim 4, wherein the drive unit comprises a drive cable having a strand to which the cap pusher is fixed.

6. A cap transfer unit according to claim 5, wherein the drive unit comprises a driving pulley and a driven pulley between which the cable is mounted, and a motor coupled to the driving pulley.

7. A cap transfer unit according to claim 1, wherein, in the rest position, the pusher is located beyond the transfer path in the vicinity of the loading area.

8. A cap transfer unit according to claim 1, further comprising a sensor for sensing presence of the cap pusher at its rest position.

9. A cap transfer unit according to claim 1, wherein the cap pusher has a stop position in which the cap pusher is spaced from the transfer path in the vicinity of the discharge area.

10. A cap transfer unit according to claim 9, wherein, in the stop position, the cap pusher is located beyond the transfer path.

11. A cap transfer unit according to claim 10, further comprising a sensor for sensing presence of the cap pusher at the stop position.

12. A cap transfer unit according to claim 1, wherein the cap transfer line is under the form of a guide rail for slidingly receiving the caps.

13. A cap transfer unit, comprising:
- a cap loading area;
- a cap discharge area;
- a guide rail defining a transfer path between the cap loading area and the cap discharge area;
- a cap feeding line upstream of the guide rail;
- a star wheel at the cap loading area, the star wheel interposed between the cap feeding line and the guide rail for feeding the caps to the transfer path;
- a cap pusher mounted for movement along the guide rail, the cap pusher having a rest position in which the cap pusher is spaced from the transfer path, and an active position in which the cap pusher overlaps at least partially the transfer path for coming into abutment with a trailing cap located on the transfer path and forcing the trailing cap to move downstream on the transfer path.

14. The cap transfer unit according to claim 13, comprising a control unit that, when an interruption in the flow of caps is sensed, activates the cap pusher into abutment with the trailing cap to evacuate the trailing cap and any other caps on the transfer path downstream of the trailing cap.

15. The cap transfer unit according to claim 13, comprising a cap sterilization chamber and the cap transfer path extends across the cap sterilization chamber where the caps are exposed to a sterilization medium.

16. The cap transfer unit according to claim 13, wherein the cap pusher has a stop position in which the cap pusher is spaced from the transfer path in the vicinity of the discharge area.

17. The cap transfer unit according to claim 16, wherein, in the stop position, the cap pusher is located downstream beyond the transfer path.

* * * * *